United States Patent [19]

Floyd et al.

[11] Patent Number: 4,479,427
[45] Date of Patent: Oct. 30, 1984

[54] BALE TAGGING APPARATUS

[76] Inventors: Don D. Floyd, 4658 El Penon Way, San Diego, Calif. 92117; Lee M. Whittle, P.O. Box 7, Brawley, Calif. 92227

[21] Appl. No.: 498,892

[22] Filed: May 27, 1983

[51] Int. Cl.³ ............................................. B30B 15/00
[52] U.S. Cl. .................................... 100/102; 226/157; 493/353; 493/449
[58] Field of Search ............. 100/102; 53/50; 40/305; 226/157; 83/160; 242/55.2; 493/353, 356, 444, 449

[56] References Cited

U.S. PATENT DOCUMENTS

| | | | |
|---|---|---|---|
| 2,468,619 | 4/1949 | Franke | 226/157 X |
| 3,890,891 | 6/1975 | Floyd et al. | 100/102 |
| 3,926,425 | 12/1975 | Pierce | 493/444 |
| 4,286,513 | 8/1981 | Floyd et al. | 100/102 |

*Primary Examiner*—Billy J. Wilhite
*Attorney, Agent, or Firm*—Baker, Maxham, Callan & Jester

[57] ABSTRACT

A bale tagging apparatus for a hay baler for automatically inserting an identification tag into a hay bale at a specified location includes a support member for attachment to a baler housing adjacent a bale chamber and including an elongated reciprocably mounted plunger and an associated intermittently connected cutter for selectively intermittently cutting a tag from a supply roll and forcing the tag through an opening in the wall of the baler housing into position within the bale chamber.

15 Claims, 5 Drawing Figures

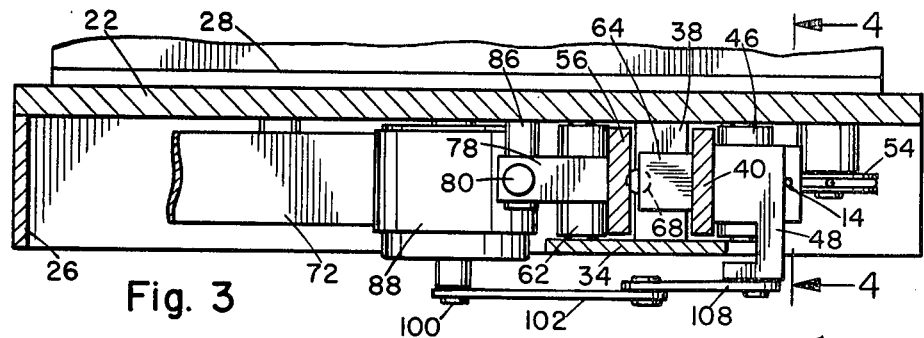
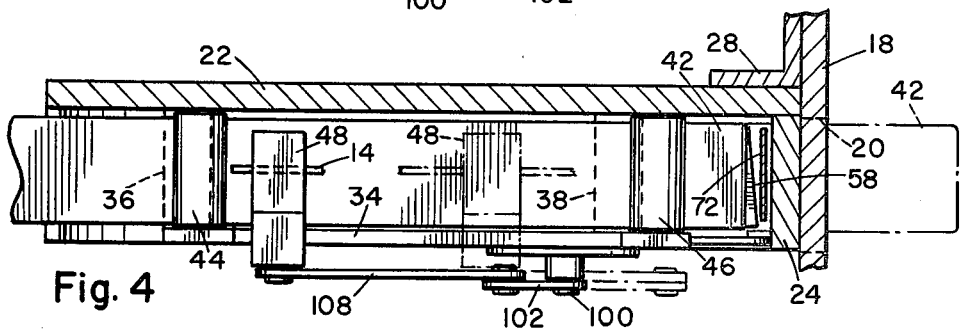
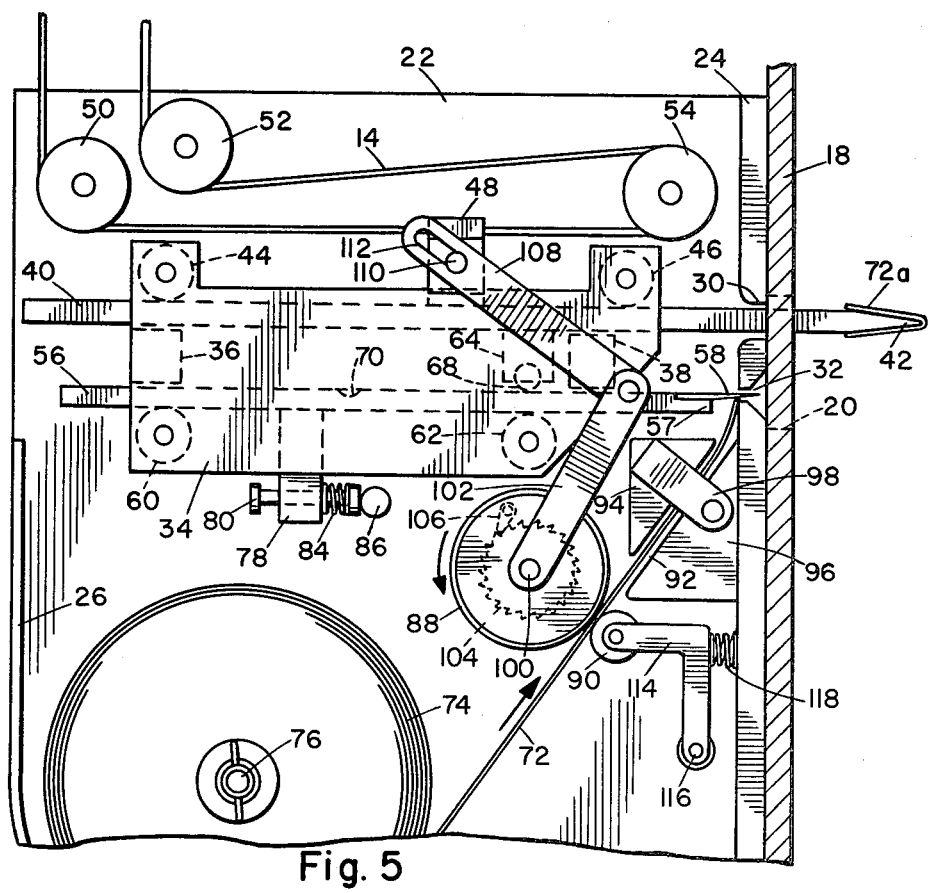

BALE TAGGING APPARATUS

BACKGROUND OF THE INVENTION

The present invention relates to baling apparatus and pertains particularly to an apparatus for inserting a tag into a bale.

Identification and other tags such as information tags and the like are routinely inserted into hay bales, cotton bales, and the like. Such tagging has been found to be desirable not only to indicate the source of the contents of the bale, but to identify the source of the owner of the bale in case of theft or the like. While the present invention is described and illustrated primarily for the tagging of bales of hay, the system and principles may be utilized for the tagging and identification of any baled commodity, such as cotton, waste, paper, and other products.

It is necessary to insert tags into the bales to prevent accidental or intentional removal or alteration thereof. The insertion into the bale can insure that the tag will not be removed unless the bale is broken.

It is also desirable that the location of the tag within the bale be preselected if desired. This enables a producer to predetermine or preselect the desired position for the identification tag within his bale.

Many devices have been proposed in that past for insertion of tags into bales of hay and the like. These, however, have had a number of drawbacks including the complex and expensive manufacture thereof as well as the unreliability thereof.

For the above reasons, it is desirable that a bale tagging apparatus be available which is simple and inexpensive to manufacture yet reliable and effective in its operation.

SUMMARY AND OBJECTS OF THE INVENTION

It is therefore the primary object of the present invention to provide an improved bale tagging apparatus.

In accordance with the primary aspect of the present invention, a tagging apparatus includes a support member for attaching to the wall of a bale chamber and including a reciprocating plunger and an associated cutting apparatus for selectively cutting and insertion of a tag from a supply roll into a bale chamber.

BRIEF DESCRIPTION OF THE DRAWINGS

The above and other objects and advantages of the present invention will become apparent from the following description when read in conjunction with the drawings wherein:

FIG. 3 is a sectional view taken on line 3—3 of FIG. 2;

FIG. 4 is a sectional view taken on line 4—4 of FIG. 3; and

FIG. 5 is a view similar to FIG. 2 showing the mechanism in the tag insertion position.

DETAILED DESCRIPTION OF A PREFERRED EMBODIMENT

Figure 1:
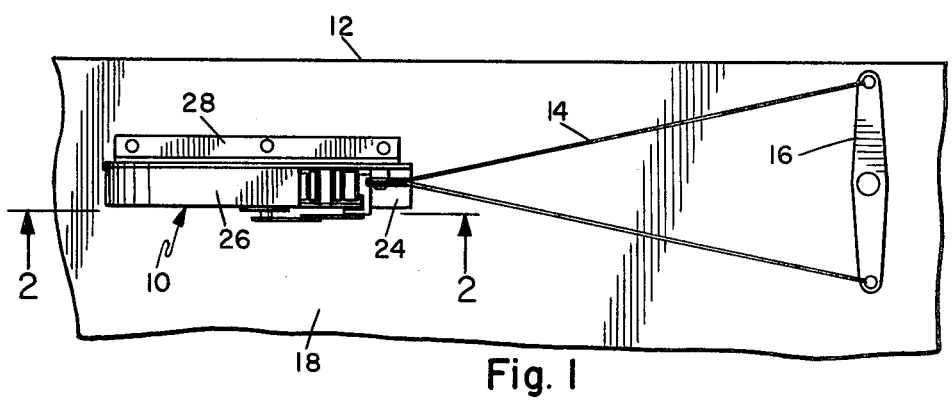
FIG. 1 is a side elevation view of the tagging apparatus attached to a hay baler.

Referring to FIG. 1 of the drawing, a bale tagging apparatus designated generally by the numeral 10 is shown attached to the side wall of a bale chamber of a hay baler 12. The tagging apparatus is driven by means of a drive line or cable 14 connected to a suitable oscillating or reciprocating portion of the hay baler, such as a oscillating or reciprocating member 16 of the tying apparatus of the baler. The tying apparatus of the baler provides a desirable drive mechanism for the tagging apparatus because of its timing which is set to operate at a particular position (i.e. the end of a formed bale). The tagging apparatus 10 can therefore be positioned such that the tag is inserted at the time of the tying cycle and the position of the tagging apparatus thereby determines the position of the tag within the bale.

Figure 2:
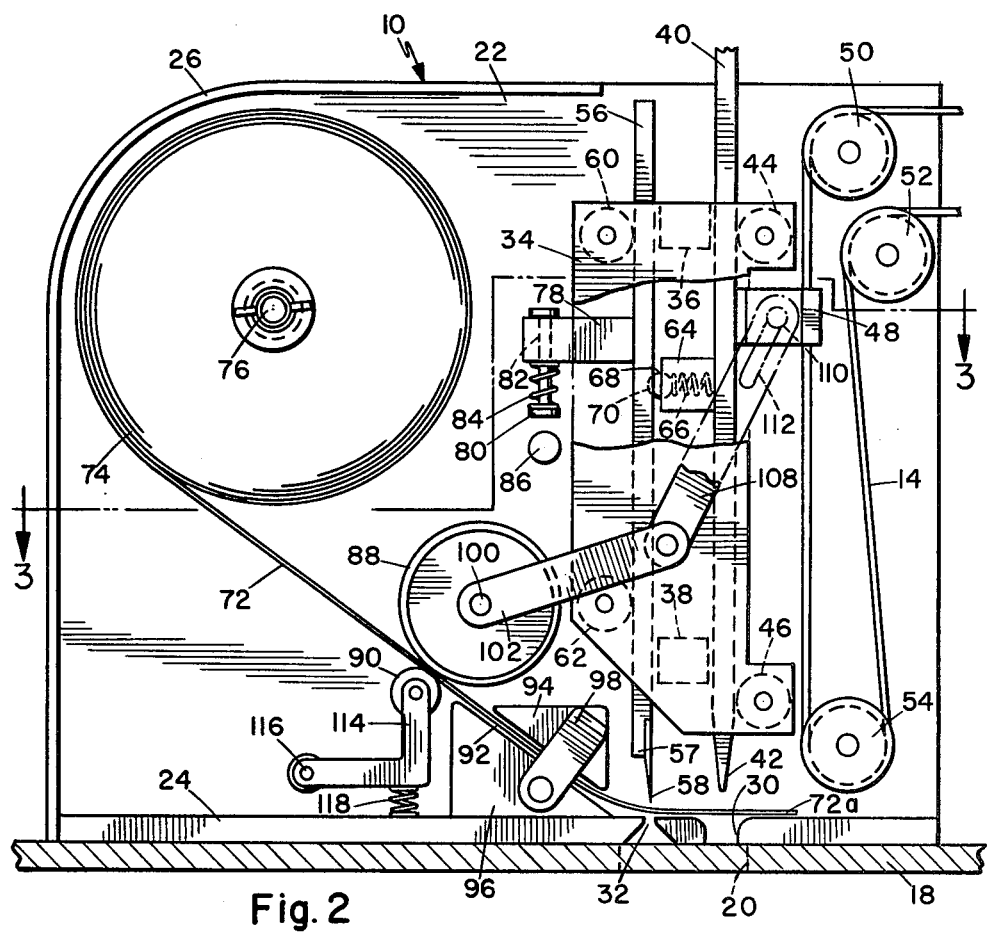
FIG. 2 is an enlarged sectional view taken on line 2—2 of FIG. 1.

Referring to FIG. 2 of the drawings, the baler 12 includes a vertical side wall portion 18 having an opening 20 directly into the bale chamber of the baler. The tagging apparatus is positioned for insertion of a tag through the opening 20 into the bale within the chamber.

The tagging apparatus includes a generally flat rectangular support member or plate 22 having a vertical generally flat front wall 24 for positioning against the wall 18 of the bale chamber and including a partial peripheral wall 26 extending around a portion of the support member. An attachment flange 28 is secured to the top of the support member 22 and provides for attachment by suitable bolts or screws directly to the wall 18 of the bale chamber of the baler.

A tag insertion slot or opening 30 is formed in the wall 24 through which the tag passes for insertion into the bale chamber. A cutting knife slot 32 is formed adjacent the tag opening for receiving the cutting knife during cutting of the tags.

A plunger guide assembly includes includes a generally rectangular flat plate 34 mounted on spacer blocks 36 and 38 which also function as guide members for mounting the plate 34 in spaced relation to the support plate 22.

An elongated tag insertion plunger 40 having a generally flat rectangular bar configuration with a generally wedge-shaped front end portion 42 is reciprocably mounted between the support plate 34 and support member 22 and in guiding relation with a pair of guide rollers 44 and 46 which are mounted between the support plates 22, 34. The tag insertion plunger 40 is aligned with the tag slot 30 in the wall 24 and with the tag opening 20 within the bale chamber wall 18. The plunger is operated by the reciprocating drive line 14 which is connected by an arm 48 to the plunger 40 and is supported on rollers 50, 52 and 54 rotatably mounted on the support plate 22. The cable or line 14 is reciprocated periodically with movement of the tying mechanism for the bale. This reciprocal movement reciprocates the tag insertion plunger 40 through its stroke for intermittently engaging and forcing a tag into the bale chamber.

A tag cutting bar 56 in the form of an elongated generally rectangular bar having a forward end with a cutting knife or blade 58 mounted thereon and positioned to pass through or into the knife slot 32. The cutting bar 56 is reciprocably mounted between the support plates 22 and 34 and between the guide blocks 36 and 38 and a pair of guide rollers 60 and 62 which are rotatably mounted on suitable pins or shafts between the support plates 22 and 34.

Releasable connecting means connects the cutting bar 56 to move with the tag plunger 40. The releasable connecting means comprises a detent mechanism 64 including a barrel member having a cylindrical bore in which is disposed a coil spring 66 for biasing a detent ball 68 into a detent recess 70 of a semi-spherical configuration formed in the bar 56. As positioned in FIG. 2, the bars 42 and 56 are coupled through the releasable connecting means 64 for movement of the cutting bar 56 along with the tag insertion plunger 40 forward with the plunger on its forward stroke forcing the knife 58 into cutting engagement with a ticket strip 72 from a tape roll 74 which is rotatably mounted on a spindle 76 on the support plate 22.

A return mechanism for the cutting bar 56 includes an arm 78 attached to and extending outward to one side of the cutting bar 56 and including a return plunger comprising a double headed pin 80 reciprocably mounted within a bore 82 in the arm 78 and including a coil spring 84 biasing the pin 80 in a forward direction for engagement with a stop pin 86 mounted on the support member or plate 22. As the cutting bar 56 moves forward with a blade 58 passing through slot 32 after cutting a ticket from the ticket strip 72, the stop end 57 of the bar 56 engages the wall 24 stopping the cutting bar. At the same time, the bar has moved forward the pin 80 engages stop 86 compressing spring 84 such that when the cutting bar 56 stops, plunger 40 continues forward with the detent 64 releasing the cutting bar 56 by the detent ball 68 sliding out of the detent 70. The cutting bar 56 is then immediately biased to a 5 retracted position by means of the spring 84 with the cutting blade or knife 58 thereby clearing the tag strip 72 for movement or advancement to the next tag.

The tag strip 72 passes between a drive roller 88 and a pinch roller 90 and through a slot 92 between a pair of guide blocks 94 and 96. A retaining tab 98 pivots between positions as illustrated covering the slot and a position out of the way of the slot for permitting threading of the tag strip into the guide slot.

The drive roller 88 is mounted on a shaft or spindle 100 and is drivingly connected to a drive arm 102 by a ratchet means such as illustrated in FIG. 5, including a ratchet wheel 104 and a drive dog 106, such that oscillation of the drive arm 102 about the shaft 100 advances the drive wheel 88 a partial turn calculated to advance the ticket strip one ticket length with each intermittent rotation of the drive wheel 88. A link member 108 is pinned at one end to the arm 102 and is connected at the other end by a pin and slot combination 110, 112 to the drive arm 48 of the tag insertion plunger 40. Thus, with each reciprocation of the plunger 40, an oscillation of the arm 102 takes place with each oscillation advancing the drive wheel 108 one tag length.

The pinch roller 90 is illustrated as mounted on a generally L-shaped arm 114 pivotally mounted on a pin 116 and biased by spring 118 into pinching engagement with the roller 88 for maintaining a driving engagement of the tag strip 72 into engagement with the drive wheel 88.

In operation, with the unit positioned as shown in FIG. 2, a forward end of the tag strip 72 has advanced to a position in front of the tag plunger 40 and across the opening 30 and in front of the cutting knife 58. As the baler begins a tying cycle, the tying mechanism will drive the actuating cable or line 14 thereby advancing the tag plunger 40 forward toward the opening 30 in the wall 24. The wedge-shaped forward end 42 of the plunger 40 engages the center of the tag 72a just after engagement by the knife 58 and partial cutting thereof as the knife passes into the slot 32. The tag 72a is forced by the sloping or curved walls of the slot 32 to fold around the end 42 of the plunger 40 as it passes through the opening with the plunger then extending into the bale chamber into the material therein. As the tag plunger 40 moves forward, the knife 58 passes its cutting position, the plunger stop or shoulder 57 engages the wall 24 adjacent slot 32 stopping the cutting bar with the connecting detent 64 releasing the cutting bar and the tag plunger moving forward with the bar 56 stopped in position. The compressed return spring 84 then takes over and retracts the cutting bar 56 to a position clearing the tag strip permitting it to be advanced forward as the tag plunger 40 begins its retraction movement out of the bale chamber. As the plunger moves out, the detent ball 68 moves into the detent 70 thus engaging and reconnecting the cutting bar 56 to the plunger 40. At the same time, the linkage 108, 102 drives through the ratchet mechanism, the tag advance or drive wheel 88 advancing the strip of tags into a position for the next tag and insertion strokes.

Thus, while we have illustrated and described our invention by means of specific embodiments, it is to be understood that numerous changes and modifications may be made therein without departing from the spirit and scope of the invention as defined in the appended claims.

We claim:

1. A tagging apparatus for a baler for inserting tags into a bale, said attachments comprising;
   a support member for attachment to a wall of a bale chamber of a baler;
   a tag insertion plunger reciprocally mounted on said support member for intermittently engaging and forcing a tag into a bale chamber; and
   tag feeding means for intermittently feeding tags to a position for engagement by said plunger, including mounting means for mounting a roll of tags; and
   cutting means releasably carried by said plunger to its cutting position for cutting a tag from a roll.

2. A tagging attachment according to claim 1 wherein said plunger includes a generally wedge-shaped forward end, and
   means cooperating with said plunger for folding a tag across said forward end.

3. A tagging attachment according to claim 1 wherein said plunger is an elongated rectangular bar; and
   said support member includes a wall having an opening through which said plunger reciprocates.

4. The tagging attachment of claim 1 including retracting means for retracting said cutting means from the cutting position.

5. The tagging apparatus of claim 4 including releasable connecting means for releasably connecting said cutting means to move with said plunger to said cutting position.

6. The tagging apparatus of claim 5 wherein said cutting means comprises an elongated bar reciprocably mounted on said support member; and
   said bar having a forward end and a cutting blade mounted on said forward end.

7. A tagging apparatus according to claim 6 wherein said tag feeding means comprises a tag driving wheel; and
   linkage means including ratchet means connected for movement with said plunger for intermittently rotating said driving wheel.

8. The tagging attachment of claim 1 wherein said cutting means is an elongated bar member reciprocably mounted on said support member; and releasable connecting means for releasably connecting said cutting member to said plunger.

9. The tagging attachment of claim 8 wherein said releasable cutting means comprises detent means.

10. A tagging apparatus for a baler for inserting tags into a bale, said attachment comprising:

a support member including a wall having an opening for attachment to a wall of a bale chamber of a baler;

a tag insertion plunger bar reciprocally mounted on said support member for intermittently engaging and forcing a tag through said opening into a bale chamber;

said tag insertion plunger is defined by an elongated rectangular bar having a generally wedgeshaped forward end, mounting means for mounting a roll of tags;

means for intermittently feeding tags to a position for engagement by said plunger, means cooperating with said plunger for folding a tag across said forward end;

cutting means for cutting a tag from a roll; and releasable connecting means for releasably connecting said cutting means to said plunger for movement therewith to its cutting position.

11. The tagging attachment of claim 10 including retracting means for retracting said cutting means from the cutting position.

12. A tagging apparatus for a baler for inserting tags into a bale, said attachment comprising:

a support member for attachment to a wall of a bale chamber of a baler;

a tag insertion plunger reciprocally mounted on said support member for intermittently engaging and forcing a tag into a bale chamber; and said tag insertion plunger includes a generally wedge-shaped forward end;

means for intermittently feeding tags to a position for engagement by said plunger, means cooperating with said plunger for folding a tag across said forward end, cutting means for cutting a tag from a supply of tags; and releasable connecting means for releasably connecting said cutting means to move with said plunger to a cutting position.

13. A tagging attachment according to claim 12 wherein said plunger is an elongated rectangular bar; and said support member includes a wall having an opening through which said plunger reciprocates.

14. The tagging apparatus of claim 12 wherein said cutting means comprises an elongated bar reciprocably mounted on said support member; and said bar having a forward end and a cutting blade mounted on said forward end.

15. A tagging apparatus according to claim 14 wherein said tag feeding means comprises a tag driving wheel; and linkage means including ratchet means connected for movement with said plunger for intermittently rotating said driving wheel.

* * * * *